(12) United States Patent
Kis et al.

(10) Patent No.: US 12,266,171 B2
(45) Date of Patent: Apr. 1, 2025

(54) METHOD AND DEVICE FOR PROCESSING IMAGE

(71) Applicant: Samsung Electronics Co., Ltd., Suwon-si (KR)

(72) Inventors: Gennadiy Kis, Kiev (UA); Andrii Bugaiov, Kiev (UA)

(73) Assignee: Samsung Electronics Co., Ltd., Suwon-si (KR)

( * ) Notice: Subject to any disclaimer, the term of this patent is extended or adjusted under 35 U.S.C. 154(b) by 461 days.

(21) Appl. No.: 17/423,753

(22) PCT Filed: Jan. 17, 2020

(86) PCT No.: PCT/KR2020/000853
§ 371 (c)(1),
(2) Date: Jul. 16, 2021

(87) PCT Pub. No.: WO2020/149692
PCT Pub. Date: Jul. 23, 2020

(65) Prior Publication Data
US 2022/0114811 A1    Apr. 14, 2022

(30) Foreign Application Priority Data

Jan. 18, 2019    (KR) .................. 10-2019-0007131

(51) Int. Cl.
*G06V 20/20*    (2022.01)
*G02B 27/01*    (2006.01)
(Continued)

(52) U.S. Cl.
CPC ......... *G06V 20/20* (2022.01); *G02B 27/0172* (2013.01); *G06T 7/50* (2017.01);
(Continued)

(58) Field of Classification Search
CPC .... G06V 20/20; G06V 10/141; G06V 10/147; G06V 10/60; G02B 27/0172;
(Continued)

(56) References Cited

U.S. PATENT DOCUMENTS 9,030,492 B2    5/2015    Bischoff et al.
10,025,060 B2    7/2018    Lanman et al.
(Continued)

FOREIGN PATENT DOCUMENTS

| JP | 2008-532149 A | 8/2008 |
| KR | 10-2018-0091014 A | 8/2018 |
| KR | 10-2018-0122726 A | 11/2018 |

OTHER PUBLICATIONS

Focal length, Wikipedia, 2017 (Year: 2017).*
(Continued)

*Primary Examiner* — Jianxun Yang
(74) *Attorney, Agent, or Firm* — Jefferson IP Law, LLP (57) ABSTRACT

Provided is an image processing method including identifying a plurality of real-world objects or a plurality of virtual objects included in an image recognized by a device, obtaining depth information of each of the plurality of identified real-world objects or virtual objects, and outputting light of a virtual image corresponding to the plurality of identified
(Continued)

real-world object or virtual object based on the depth information of each of the plurality of identified real-world objects or virtual objects.

12 Claims, 10 Drawing Sheets

(51) Int. Cl.
*G06T 7/50* (2017.01)
*G06T 19/00* (2011.01)
*G06V 10/141* (2022.01)
*G06V 10/147* (2022.01)
*G06V 10/60* (2022.01)

(52) U.S. Cl.
CPC .......... *G06T 19/006* (2013.01); *G06V 10/141* (2022.01); *G06V 10/147* (2022.01); *G06V 10/60* (2022.01)

(58) Field of Classification Search
CPC ......... G02B 30/27; G06T 7/50; G06T 19/006; G06T 7/571; G06T 19/00; H04N 13/383; H04N 13/344; H04N 13/398; H04N 13/366; H04N 13/322; H04N 13/332
See application file for complete search history.

(56) References Cited

U.S. PATENT DOCUMENTS

| | | | |
|---|---|---|---|
| 10,359,630 | B2 | 7/2019 | Raval et al. |
| 10,656,720 | B1 | 5/2020 | Holz |
| 2013/0278631 | A1 | 10/2013 | Border et al. |
| 2013/0286004 | A1 | 10/2013 | McCulloch et al. |
| 2014/0168783 | A1 | 6/2014 | Luebke et al. |
| 2014/0292620 | A1 | 10/2014 | Lapstun |
| 2015/0213648 | A1 | 7/2015 | Wu et al. |
| 2015/0221135 | A1 | 8/2015 | Hill et al. |
| 2017/0184848 | A1 | 6/2017 | Vallius |
| 2017/0206713 | A1 | 7/2017 | Lo et al. |
| 2018/0074332 | A1 | 3/2018 | Li et al. |
| 2018/0124371 | A1 | 5/2018 | Kamal et al. |
| 2018/0275410 | A1 | 9/2018 | Yeoh et al. |
| 2019/0018236 | A1* | 1/2019 | Perreault ............ G02B 27/0172 |
| 2020/0319466 | A1 | 10/2020 | Welch et al. |

OTHER PUBLICATIONS

International Search Report and Written Opinion dated Apr. 23, 2020, issued in International Patent Application No. PCT/KR2020/000853.

Vergence-Accommodation Conflict, From Virtual Reality and Augmented Reality Wiki, https://xinreality.com/wiki/Vergence-Accommodation_Conflict, last modified on Jan. 10, 2019.

Douglas Lanman et al., Supplementary Material: Near-Eye Light Field Displays, NVIDIA Research, Nov. 2013.

David Dunn et al., Wide Field Of View Varifocal Near-Eye Display Using See-Through Deformable Membrane Mirrors, IEEE Transactions on Visualization and Computer Graphics, vol. 23, No. 4, Apr. 2017.

Hong Hua et al., A 3D integral imaging optical see-through head-mounted display, Jun. 2014.

Hakan Urey et al., State of the Art in Stereoscopic and Autostereoscopic Displays, Proceedings of the IEEE, vol. 99, No. 4, Apr. 2011.

Xin Jin et al., Point spread function and depth-invariant focal sweep point spread function for plenoptic camera 2.0, Optics Express 9947, vol. 25, No. 9, May 2017.

Gregory Kramida, Resolving the Vergence-Accommodation Conflict in Head-Mounted Displays, IEEE Transactions on Visualization and Computer Graphics, Aug. 2015.

Yasmin Tayag, Why Vergence-Accommodation Conflict Threatens Virtual Reality Users' Vision, Oct. 2015, https://www.inverse.com/article/7244-why-vergence-accommodation-conflict-threatens-virtual-reality-users-vision.

Andrew Lumsdaine et al., The Focused Plenoptic Camera, Apr. 2009.

Andrew Lumsdaine et al., Full Resolution Lightfield Rendering, Jan. 2008.

Praneeth Chakravarthula et al., "FocusAR: Auto-focus Augmented Reality Eyeglasses for both Real World and Virtual Imagery", IEEE Transactions on Visualization and Computer Graphics, IEEE, USA, vol. 24, No. 11, Nov. 1, 2018, pp. 2906-2916.

Han-Le Zhang et al., "Tabletop augmented reality 3D display system based on integral imaging", Journal of the Optical Society of America-B., vol. 34, No. 5, Feb. 17, 2017, p. B16, XP055883540.

Extended European Search Report dated Feb. 4, 2022, issued in European Patent Application No. 20741300.6-1208.

European Office Action dated Aug. 5, 2024, issued in International Patent Application No. 20 741 300.6-1207.

* cited by examiner

METHOD AND DEVICE FOR PROCESSING IMAGE

TECHNICAL FIELD

Embodiments relate to a method and device for processing an image, and more particularly, to a method and device for processing an image, wherein virtual reality or augmented reality is implementable.

BACKGROUND ART

Virtual reality (VR) is technology enabling a user to experience a full virtual world isolated from the real world by providing a virtual object or information to the user. Interests in implementation of the VR is increasing with the development of electronic devices and display devices capable of implementing the VR. Also, a technology (scheme) for realizing augmented reality (AR) is being studied as a next step of the VR.

Unlike the VR based on the full virtual world, the AR is a display technology for further increasing an effect of the reality by overlapping or combining a virtual object or information on or with an environment of the real world. The VR is limitedly applicable to fields such as games and virtual experience, whereas the AR is applicable to various reality environments. In particular, the AR is receiving attention as a next-generation display technology suitable to a ubiquitous environment or an Internet of things (IoT) environment.

DESCRIPTION OF EMBODIMENTS

Technical Problem

Embodiments of the present disclosure propose a method and device for processing an image, wherein a vergence-accommodation conflict phenomenon that may cause a user to lose an immersive sense or cause fatigue to eyes of the user may be resolved when implementing virtual reality or augmented reality.

Solution to Problem

According to embodiments of the present disclosure, an image processing method includes identifying a plurality of real-world objects or a plurality of virtual objects included in an image recognized by a device, obtaining depth information of each of the plurality of identified real-world objects or virtual objects, and outputting light of a virtual image corresponding to the plurality of identified real-world objects or virtual objects based on the depth information of each of the plurality of identified real-world objects or virtual objects.

BEST MODE

A method of processing an image, according to an embodiment, may include: identifying a plurality of real-world objects or a plurality of virtual objects included in an image recognized by a device; obtaining depth information of each of the plurality of identified real-world objects or virtual objects; and outputting light of a virtual image corresponding to the plurality of identified real-word objects or virtual objects, based on the depth information of each of the plurality of identified real-world objects or virtual objects.

A device for processing an image, according to an embodiment, may include: a display; a memory storing one or more instructions; and at least one processor configured to execute the one or more instructions stored in the memory to: identify a plurality of real-world objects or a plurality of virtual objects included in a recognized image; obtain depth information of each of the plurality of identified real-world objects or virtual objects; and control the display to output light of a virtual image corresponding to the plurality of identified real-word objects or virtual objects, based on the depth information of each of the plurality of identified real-world objects or virtual objects.

A computer program product, according to an embodiment, may include a recording medium storing a program for executing: an operation of identifying a plurality of real-world objects or a plurality of virtual objects included in an image recognized by a device; an operation of obtaining depth information of each of the plurality of identified real-world objects or virtual objects; and an operation of outputting light of a virtual image corresponding to the plurality of identified real-world objects or virtual objects, based on the depth information of each of the plurality of identified real-world objects or virtual objects.

MODE OF DISCLOSURE

Hereinafter, embodiments of the present disclosure will be described in detail with reference to the accompanying drawings such that one of ordinary skill in the art may easily implement the present disclosure. However, the present disclosure may be implemented in various different forms and is not limited to the embodiments described herein. Also, in the drawings, parts irrelevant to the description are omitted in order to clearly describe the present disclosure, and like reference numerals designate like elements throughout the specification.

Terms used in the present disclosure are described as general terms currently used in consideration of functions described in the disclosure, but the terms may have different meanings according to an intention of one of ordinary skill in the art, precedent cases, or the appearance of new technologies. Thus, the terms used herein should not be interpreted only by its name, but have to be defined based on the meaning of the terms together with the description throughout the specification.

While such terms as "first", "second", etc., may be used to describe various components, such components must not be limited to the above terms. The above terms are used only to distinguish one component from another.

Also, the terms used in the present disclosure are only used to describe specific embodiments, and are not intended to limit the present disclosure. An expression used in the singular encompasses the expression in the plural, unless it has a clearly different meaning in the context. Throughout the specification, when a part is "connected" to another part, the part may not only be "directly connected" to the other part, but may also be "electrically connected" to the other part with another element in between. In addition, when a part "includes" a certain component, the part may further include another component instead of excluding the other component, unless otherwise stated.

"The" and similar directives used throughout the present specification may indicate both singular and plural. Also, unless there is a clear description of an order of operations describing a method according to the present disclosure, the operations described may be performed in a suitable order. The present disclosure is not limited by the order of description of the described operations.

The phrases "some embodiments" or "an embodiment" appearing in various places in this specification are not necessarily all referring to the same embodiment.

An embodiment of the present disclosure may be represented by functional block configurations and various processing operations. Some or all of these functional blocks may be implemented by various numbers of hardware and/or software configurations that perform particular functions. For example, the functional blocks of the present disclosure may be implemented by one or more microprocessors or by circuit configurations for a certain function. Also, for example, the functional blocks of the present disclosure may be implemented in various programming or scripting languages. The functional blocks may be implemented by algorithms executed in one or more processors. In addition, the present disclosure may employ conventional techniques for electronic environment setting, signal processing, and/or data processing. Terms such as "mechanism", "element", "means", and "configuration" may be used widely and are not limited as mechanical and physical configurations.

In addition, a connection line or a connection member between components shown in drawings is merely a functional connection and/or a physical or circuit connection. In an actual device, connections between components may be represented by various functional connections, physical connections, or circuit connections that are replaceable or added.

Hereinafter, the present disclosure will be described in detail with reference to accompanying drawings.

Figure 1:
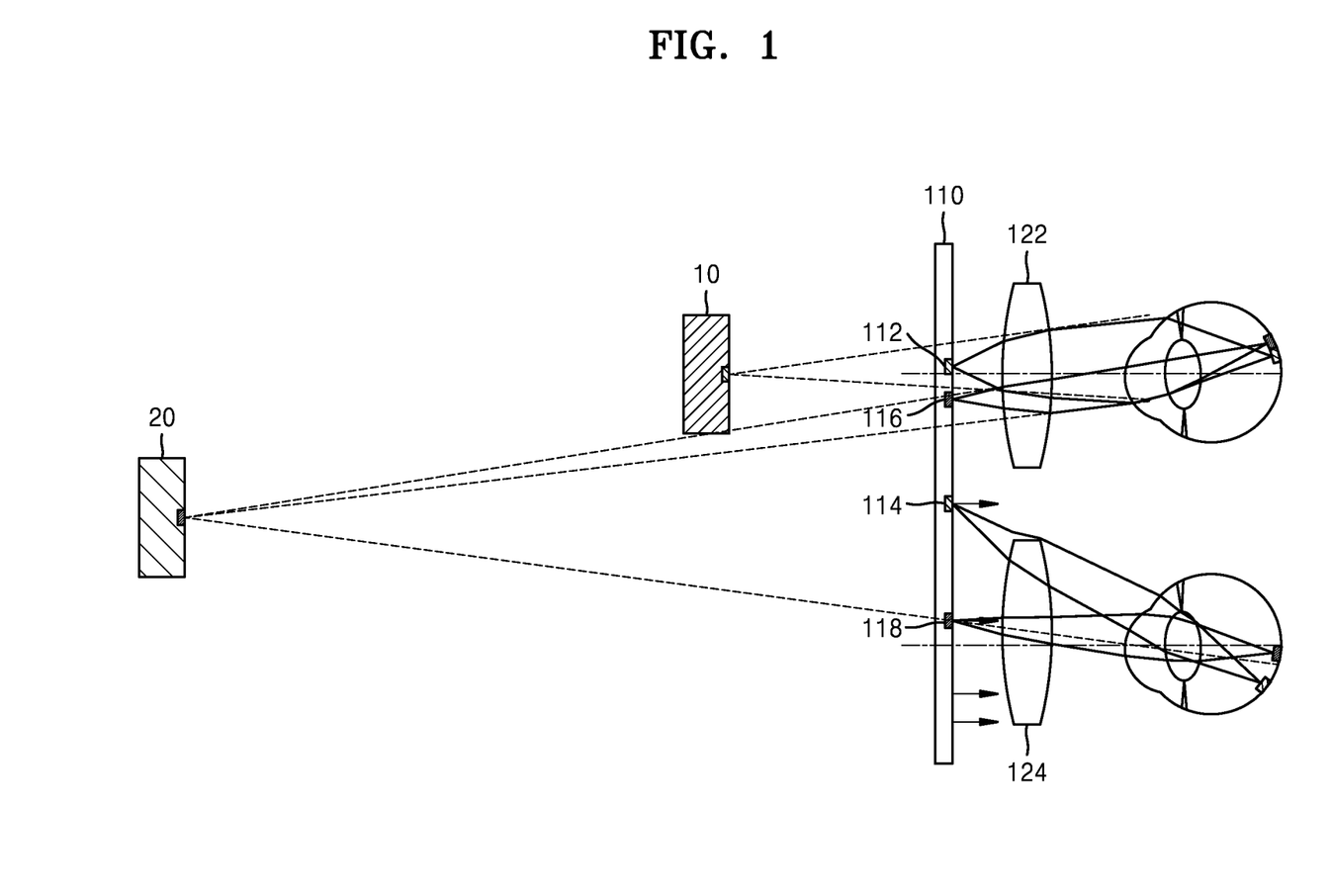
FIG. 1 is a diagram for describing a vergence-accommodation conflict phenomenon generated while a user recognizes a virtual image.

FIG. 1 is a diagram for describing a vergence-accommodation conflict phenomenon generated while a user recognizes a virtual image.

Referring to FIG. 1, light of a virtual image may be output from a display 110 located at a distance close to eyes of a user, to implement virtual reality (VR) or augmented reality (AR). Here, the display 110 may include a plurality of light-emitting devices (for example, 112, 114, 116, and 118) capable of outputting signals configuring a virtual image in a form of light. The plurality of light-emitting devices (for example, 112, 114, 116, and 118) may be present for each pixel configuring the virtual image, but this is only an example, and a light-emitting device may be present in units of pixel groups including a plurality of pixels.

The light of the virtual image output from the display 110 may be projected on lenses 122 and 124 located in front of both eyes of the user and recognized by the both eyes of the user.

When the light of the virtual image is output from the display 110 and a location of the display 110 is fixed, a vergence-accommodation conflict phenomenon in which a first object 10 located close in the virtual image and a second object 20 located far in the virtual image are recognized to have a same focal length may occur. Here, vergence denotes a fusion process in which two eyes move in opposite directions to obtain one merged image for an object. Also, accommodation denotes a focusing process in which a shape and thickness of a lens is adjusted to focus on an object located at a certain distance. In the present disclosure, a focal length may be used as a same meaning as an accommodation distance.

In the eyes of a person, a vergence distance and an accommodation distance match each other. However, when watching a 3-dimensional (3D) virtual image, the both eyes focus on the display 110 while trying to recognize a plurality of objects 10 and 20 having different depths and present in the virtual image, and thus there may be a gap between the vergence distance and the accommodation distance. In other words, the accommodation distance is the same as a distance between the eyes and the display 110, but the vergence distance continuously changes according to a size of disparity. For example, regarding the first object 10 located close and the second object 20 located far in FIG. 1, the vergence distances are different from each other whereas the accommodation distance is the same as the distance between the eyes and the display 110.

Accordingly, the eyes and the brain are confused while a gap is generated between a distance of an object in the virtual image and a distance recognized by the user, and thus not only immersion of the user during a VR experience may deteriorate, but also the user may be fatigued.

An image processing method according to an embodiment may output light of a virtual image considering depth information of an object such that an accommodation distance and a vergence distance are matched while providing the virtual image. The image processing method will be described in detail with reference to FIGS. 2 through 10.

Figure 2:
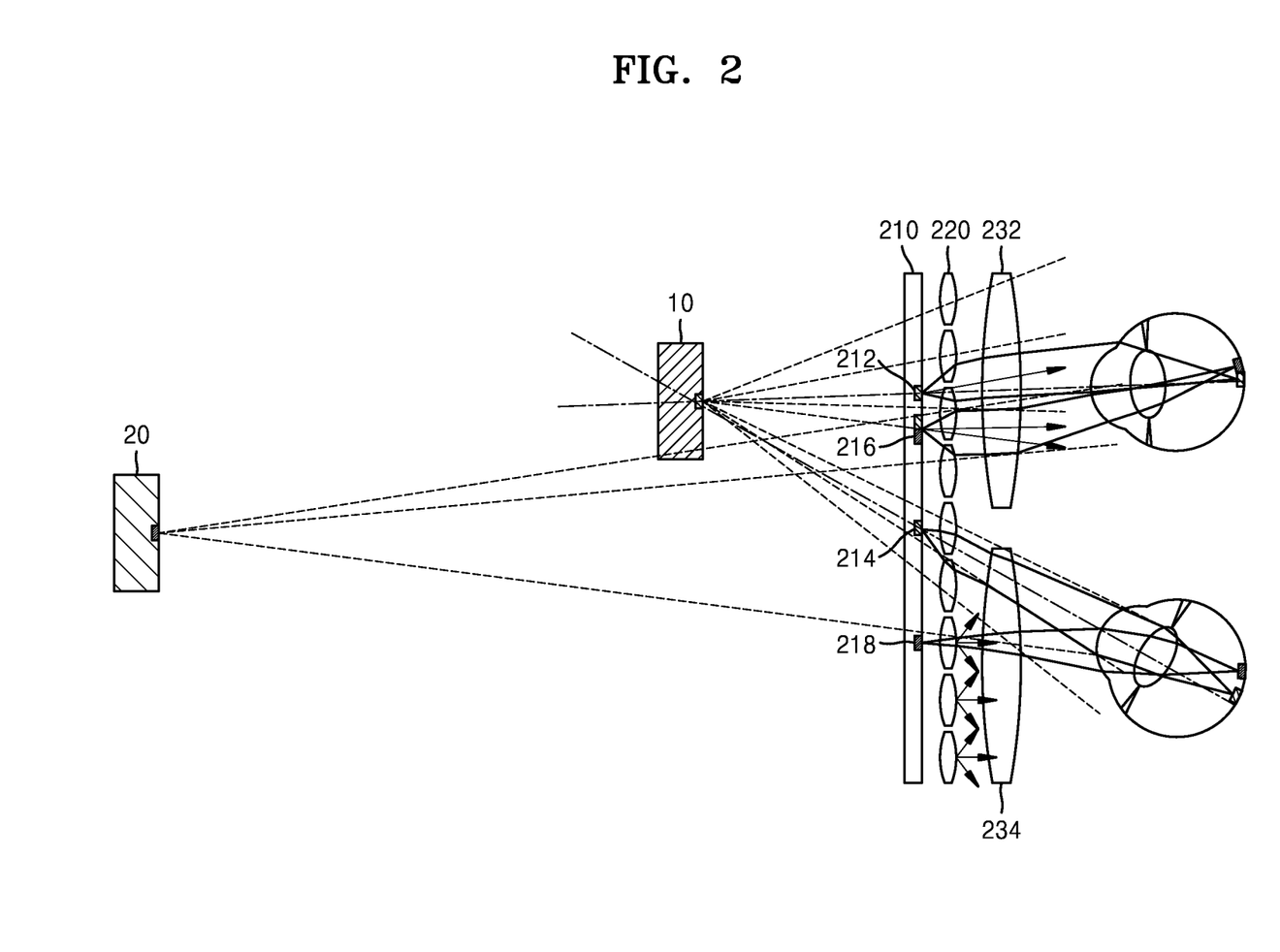
FIG. 2 is a conceptual diagram for describing an image processing method according to an embodiment.

FIG. 2 is a conceptual diagram for describing an image processing method according to an embodiment.

Referring to FIG. 2, light of a virtual image may be output from a display 210 to implement VR or AR. Here, the display 210 is a component of a device performing the image processing method according to an embodiment, and the device may include a smart glass, a head-mounted display (HMD), a near-eye display, a 3D display or the like, but this is only an embodiment and the device is not limited thereto.

Also, the display 210 may include a plurality of light-emitting devices (for example, 212, 214, 216, and 218) capable of outputting signals configuring the virtual image in a form of light. The plurality of light-emitting devices (for example, 212, 214, 216, and 218) may be present for each pixel configuring the virtual image, but this is only an example, and a light-emitting device may be present in units of pixel groups including a plurality of pixels. In the current embodiment, an operation of the device will be described with an example of light output from a first light-emitting device 212, a second light-emitting device 214, a third light-emitting device 216, and a fourth light-emitting device 218 from among the plurality of light-emitting devices.

The device according to an embodiment may obtain depth information of each of the plurality of objects 10 and 20 to determine vergence distances for the plurality of objects 10 and 20 included in the virtual image. When a user views the first object 10 located close in the virtual image, light of the first object 10 needs to be incident on a right eye in a first direction and on a left eye in a second direction, such that a vergence distance and an accommodation distance for the first object 10 match each other. The device may control the first light-emitting device 212 of the display 210 located in the first object 10 to emit the light from the first object 10 in the first direction. Accordingly, when the user's line of sight is drawn towards the first object 10, the user may recognize the first object 10 as the light in the first direction and the light in the second direction are incident on the center of the lenses of the right and left eyes of the user.

Meanwhile, the light of the virtual image output from the device according to an embodiment may be determined according to a display mode. In particular, the device may output the virtual image based on depth information of a virtual object included in the virtual image provided to implement VR in a VR mode, and output the virtual image based on depth information of a real-world object included in a real-world scene recognized to implement AR in an AR mode. Specifically, in the AR mode, the light of the virtual image generated to display virtual information for each real-world object may be output considering that the user's line of sight moves along an object. This will be described in detail with reference to FIGS. 4 and 5.

The light output via the display 210 in the device according to an embodiment may be projected on a lenticular lens 220. The lenticular lens 220 is an optical device enabling different sets of pixels to be viewed according to the user's line of sight. When the first object 10 is viewed according to the user's line of sight, light other than the light of the first object 10 may be prevented from being recognized by both eyes, via the lenticular lens 220.

Here, the lenticular lens 220 may be a component of the device performing the image processing method according to an embodiment or may be a standalone device independent from the device. For example, when the device is a wearable glass, the lenticular lens 220 may be a component of the device. As another example, when the device is a terminal implementing VR or AR by being combined to a container 9 for example, an HMD device), the lenticular lens 220 may be a component of the container.

Also, the device may control not only a direction of the light output from the first light-emitting device 212, but also a wavelength of the light. In addition, the device may adjust, according to the depth information of the plurality of objects 10 and 20, sizes of the virtual object included in the virtual image displayed according to the depth information of the plurality of objects 10 and 20.

According to an embodiment, the light of the virtual image output from the display 210 may each be recognized by the both eyes of the user by being projected on lenses 232 and 234 located in front of the both eyes of the user. Here, the lenses 232 and 234 may be components of the device performing the image processing method according to an embodiment, or may be components of a standalone device independent from the device.

Figure 3:
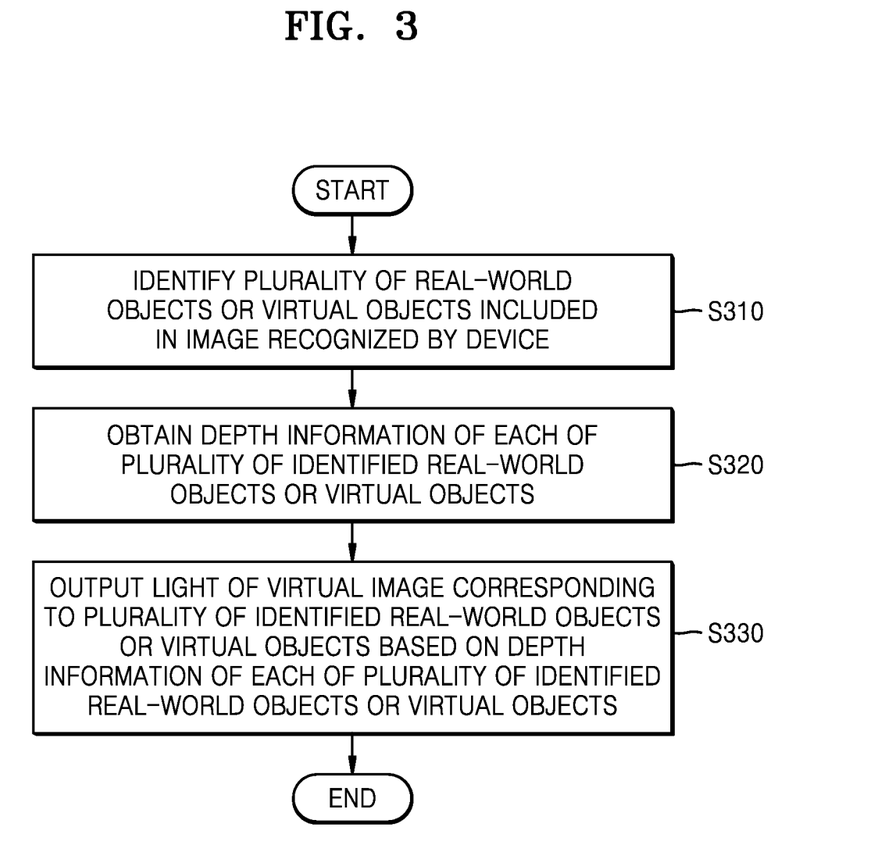
FIG. 3 is a flowchart of an image processing method according to an embodiment.

FIG. 3 is a flowchart of an image processing method according to an embodiment.

In operation S310, a device may identify a plurality of real-world objects or a plurality of virtual objects included in a recognized image.

The device according to an embodiment may identify the plurality of real-world objects or the plurality of virtual objects included in the recognized image, according to a display mode. Here, the display mode may include a VR mode and an AR mode. The VR mode denotes an operation method of providing a virtual image on a display of the device while a user's external view is blocked, and the AR mode denotes an operation method of providing a virtual image overlapping the real world. However, this is only an example and according to another example, the display mode may include a mixed reality (MR) mode.

For example, when the device operates in the VR mode, the device may recognize the virtual image to provide the virtual reality. The device may identify the plurality of virtual objects included in a recognized virtual image. As another example, when the device operates in the AR mode, the device may recognize a real-world image to display the virtual object overlapping the real world. The device may identify the plurality of real-world objects included in a recognized real-world image.

The display mode may be determined based on a user input. Here, the user input may be in a form of a touch input or a hovering input, but this is only an example and the form of the user input is not limited thereto.

In operation S320, the device may obtain depth information of each of the plurality of identified real-world objects or virtual objects. Depth information of an object indicates distance information of the object based on a pre-set point or the display of the device.

The device according to an embodiment may obtain the depth information of each of the plurality of identified virtual objects in the VR mode. For example, the device may obtain, from the virtual image, the depth information indicating that a distance between an identified first object and the display is d_v1 and that a distance between an identified second object and the display is d_v2.

The device according to another embodiment may obtain the depth information of each of the plurality of identified real-world objects in the AR mode. For example, the device may obtain, from the real-world image, the depth information indicating that a distance between an identified first object and the display is d_a1 and that a distance between an identified second object and the display is d_a2.

In operation S330, the device may output light of the virtual image corresponding to the plurality of identified real-world objects or virtual objects, based on the depth information of each of the plurality of identified real-world objects or virtual objects.

The device according to an embodiment may output the light of the virtual image such that a focal length of each of the plurality of real-world objects or virtual objects corresponds to the obtained depth information.

The device may determine a direction of light output from a light-emitting device included in a region of the display corresponding to a first object such that an accommodation distance and a vergence distance of the first object match each other. Also, the device may control the direction of the light such that an accommodation distance and a vergence distance match each other for an object other than the first object.

The device according to an embodiment may output the light of the virtual image according to the determined direction of the light. The light of the virtual image output from the device may be transmitted to the eyes of the user via a lenticular lens. The lenticular lens enables pixels of different sets to be observed according to the user's line of sight such that the user views different pieces of virtual information according to the line of sight or only virtual information corresponding to a certain line of sight.

Figure 4:
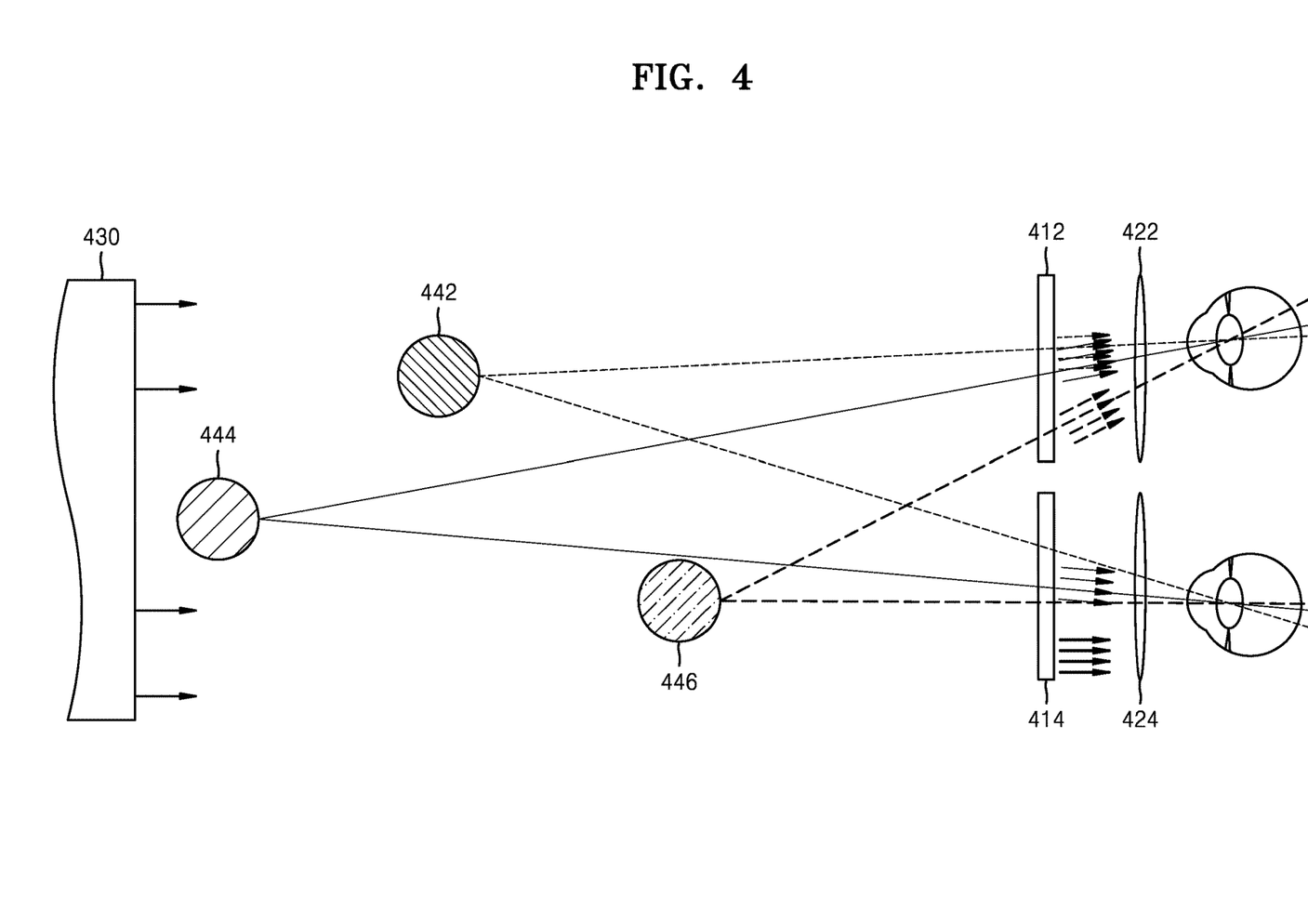
FIG. 4 is a diagram for describing a method by which a device outputs light of a virtual image in a virtual reality (VR) mode, according to an embodiment.

FIG. 4 is a diagram for describing a method by which a device outputs light of a virtual image in a VR mode, according to an embodiment.

Referring to FIG. 4, the device may recognize the virtual image including a plurality of virtual objects 430, 442, 444, and 446 when set in the VR mode. The device according to an embodiment may determine a light output direction of regions of displays 412 and 414 corresponding to each virtual object such that an accommodation distance and a vergence distance match each other, in consideration of depth information of each of the plurality of virtual objects 430, 442, 444, and 446. Here, regarding a first object 430 corresponding to a background of the virtual image, the light output direction may be set to be the same as an existing light output direction as the first object 430 is located on an entire region of the virtual image.

The device according to an embodiment may obtain depth information of a second object 442. The device may determine the light output direction for matching a vergence distance and an accommodation distance regarding the second object 442, based on the obtained depth information. For example, the light output direction may be a first direction and a second direction, which are straight lines connecting the second object 442 and centers of a right eye and a left eye of a user, for the right eye and the left eye, respectively. The device may control a light-emitting device of a pixel located in the first direction from the second object 442 to output light of the second object 442 in the first direction, on the display 412 of the right eye. Also, the device may control a light-emitting device of a pixel located in the second direction from the second object to output light of the second object 442 in the second direction, on the display 414 of the left eye.

The above method may be identically applied to a third object 444 and a fourth object 446 located at points of different depth values.

The light of the virtual image output from the displays 412 and 414 may be projected on lenses 422 and 424 located in front of both eyes of the user and recognized by the both eyes of the user, respectively.

Figure 5:
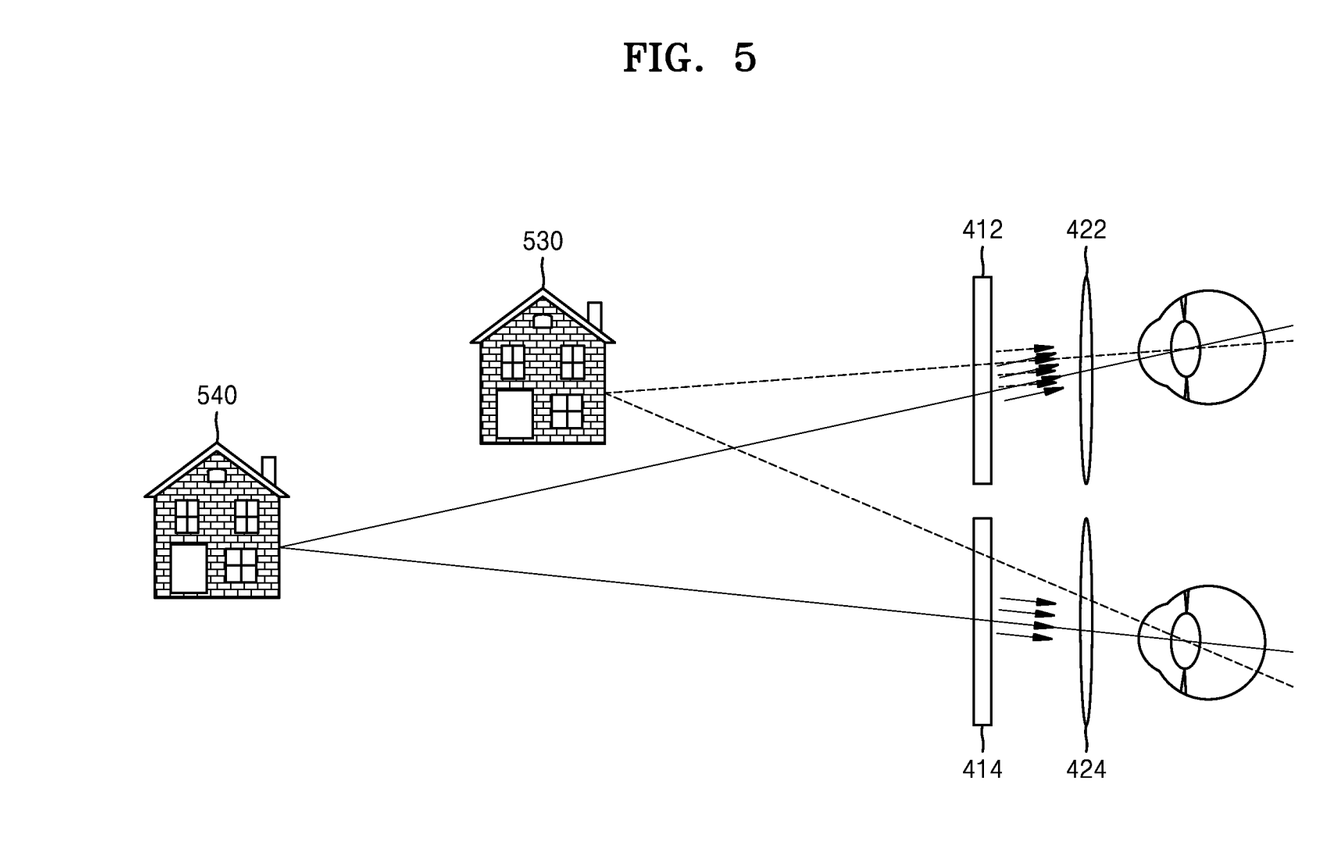
FIG. 5 is a diagram for describing a method by which a device outputs light of a virtual image in an augmented reality (AR) mode, according to an embodiment.

FIG. 5 is a diagram for describing a method by which a device outputs light of a virtual image in an AR mode, according to an embodiment.

Referring to FIG. 5, the device may recognize a real-world image including a plurality of real-world objects 530 and 540 when set in the AR mode. The device according to an embodiment may determine a light output direction of regions of the displays 412 and 414 corresponding to each real-world object such that an accommodation distance and a vergence distance match each other, in consideration of depth information of each of the plurality of real-world objects 530 and 540. The device may implement AR by displaying virtual information at a location of a real-world object without having to use an eye tracking apparatus for tracking a line of sight of a user, by using the fact that users generally direct their eyes toward an object.

For example, the device may obtain depth information of a first object 530 and a second object 540 included in the real-world image. Here, the depth information of the first object 530 and the second object 540 may be d1 and d2, respectively. The device may output the light of the virtual image such that virtual information is recognized at the corresponding depth information, considering the depth information of each of the real-world objects 530 and 540.

In the current embodiment, the device may determine, for the first object 530, a light output direction for matching an accommodation distance and a vergence distance to be a first direction and a second direction respectively for a right eye and a left eye, based on the depth information d1. Also, the device may determine, for the second object 540, a light output direction for matching an accommodation distance and a vergence distance to be a third direction and a fourth direction respectively for the right eye and the left eye, based on the depth information d2.

Accordingly, the device may control light-emitting devices of pixels located in the first direction and the second direction from the first object 530 to output light of virtual information in the first direction and the second direction on the displays 412 and 414, respectively. Also, the device may control light-emitting devices located in the third direction and the fourth direction from the second object 540 to output light of virtual information in the third direction and the fourth direction on the displays 412 and 414, respectively.

Meanwhile, the displays 412 and 414 may be controlled such that the light of the virtual image including same virtual information is output for the first object 530 and the second object 540, according to an embodiment. Accordingly, virtual information may be displayed for each real-world object even when the eyes perform saccade to recognize virtual objects, and thus immersion of the user regarding AR may be improved.

The light of the virtual image output from the displays 412 and 414 may be projected on the lenses 422 and 424 located in front of both eyes of the user and recognized by the both eyes of the user, respectively.

Figure 6:
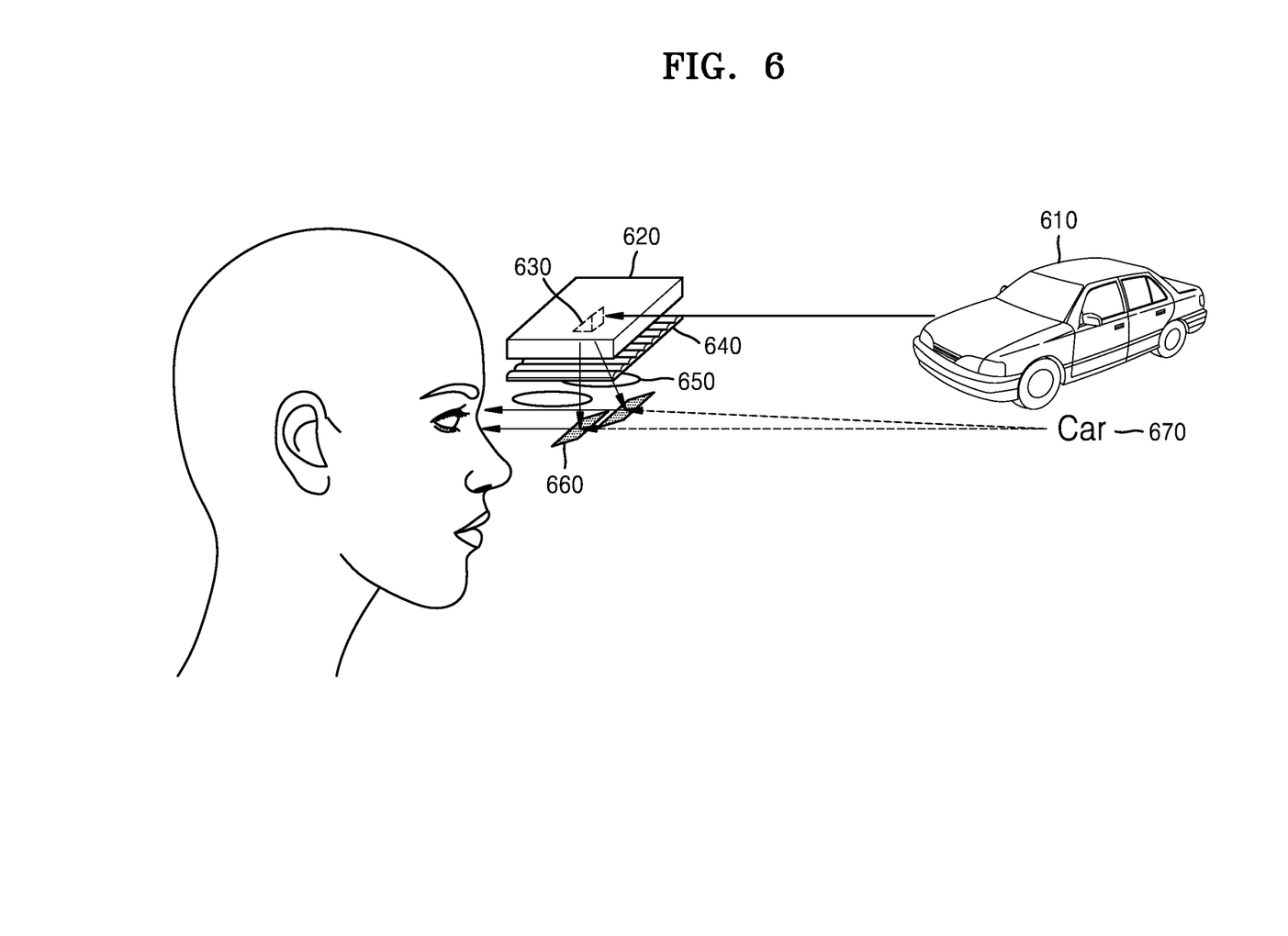
FIG. 6 is a diagram for describing in detail an image processing method in an AR mode, according to an embodiment.

FIG. 6 is a diagram for describing in detail an image processing method in an AR mode, according to an embodiment.

Referring to FIG. 6, an image processing system according to an embodiment may include a device 620, an input prism 630, a lenticular lens 640, a magnifying lens 650, and a transparent mirror 660.

The device 620 according to an embodiment may recognize a real-world image via a camera. Here, the device 620 may perform operations of the device described with reference to FIG. 5. The device 620 may determine depth information of objects included in the recognized real-world image. For example, the device 620 may determine depth information of a vehicle 610 included in the real-world image to be dx.

Considering the fact that a line of sight of a user is generally toward an object, the device 620 may output light of a virtual image including virtual information at a location corresponding to the depth information of the vehicle 610. Also, the device may control a light output direction such that an accommodation distance and a vergence distance match each other for the virtual information while displaying the virtual information at the location corresponding to the depth information of the vehicle 610. For example, when virtual information 670 of "car" is to be displayed as the virtual information, the device 620 may control the light output direction such that an accommodation distance and a vergence distance of the virtual information 670 of "car" correspond to the depth information dx of the vehicle 610. In detail, the device 620 may determine the light output direction to be a direction of a straight line connecting the vehicle 610 to centers of both eyes of the user.

The device 620 according to an embodiment may output the light of virtual image including the virtual information 670 of "car", i.e., the virtual information, based on the determined light output direction. In the present disclosure, a method of displaying virtual information for one real-world object has been described, but a device according to an embodiment may control the light output direction such that the virtual information 670 of "car" is displayed at a location corresponding to each of all real-world objects when there are a plurality of real-world objects in a real-world scene.

The light output from the device 620 may be transmitted to the lenticular lens 640 via the input prism 630. The user may recognize only virtual information displayed at a location corresponding to the line of sight of the user, via the lenticular lens 640.

The light transmitted through the lenticular lens 640 may be incident on the both eyes of the user via the magnifying lens 650 and the transparent mirror 660. Accordingly, the user may recognize, together with the vehicle 610, the virtual information 670 of "car" at the location corresponding to the depth information of the vehicle 610, i.e., the real-world object.

Figure 7:
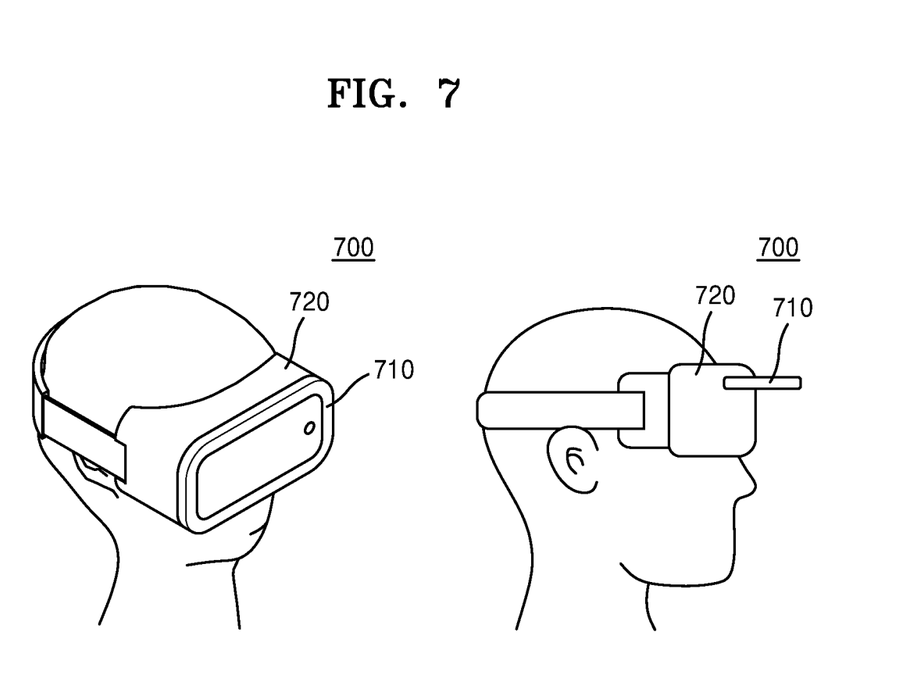
FIG. 7 is a diagram showing a user wearing a device according to a display mode, according to an embodiment.

FIG. 7 is a diagram showing a user wearing a device according to a display mode, according to an embodiment.

An image system 700 according to an embodiment may support both an AR mode implementing AR and a VR mode implementing VR. The image system 700 may include a device 710 and a container 720. The device 710 according to the current embodiment may correspond to the device described above with reference to FIGS. 2 through 6.

When the image system 700 according to an embodiment operates in the VR mode, the device 710 may be arranged to cover a front surface of the container 720 to block an external view of a user. Accordingly, the user using the image system 700 may experience VR by viewing a virtual image through a display of the device 710, while the external view of the user is blocked.

According to another embodiment, when the image system 700 operates in an AR mode, the device 710 may be arranged horizontally to the container 720 such that the front surface of the container is opened, so as to display a virtual image overlapping the real world. Accordingly, the user using the image system 700 may experience AR by viewing the virtual image overlapping the real world while recognizing the real world.

Figure 8:
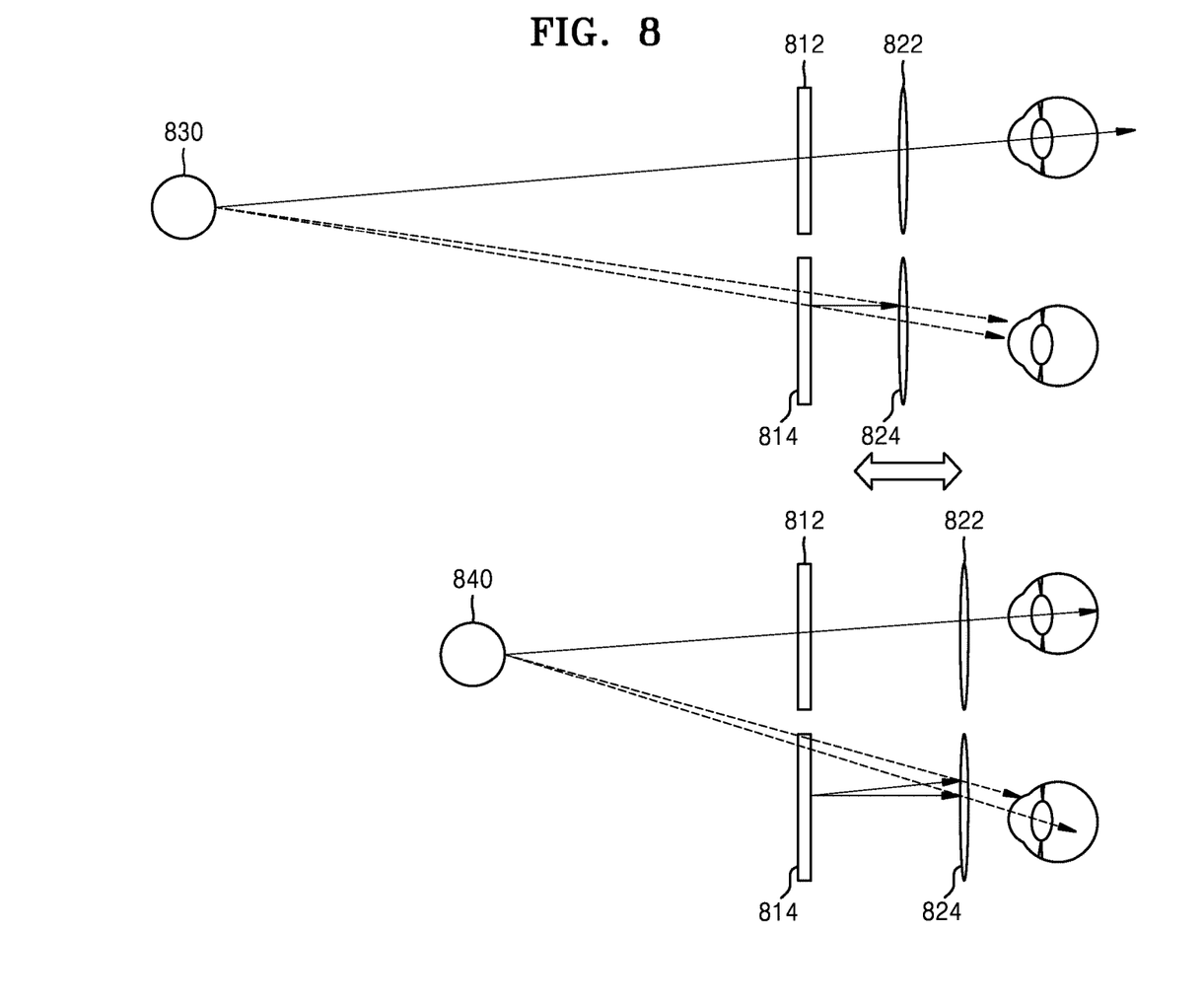
FIG. 8 is a diagram for describing a method by which a device moves a lens projecting light of a virtual image to process the virtual image, according to an embodiment.

FIG. 8 is a diagram for describing a method by which a device moves lenses 822 and 824 projecting light of a virtual image to process the virtual image, according to an embodiment.

Referring to FIG. 8, the device according to an embodiment may determine locations of the lenses 822 and 824 projecting the light of the virtual image according to depth information of an identified object. For example, the device may determine whether light of a first object 830 being projected on a first lens 822 and a second lens 824 is focused on both eyes of a user, based on the locations of the first lens 822 and the second lens 824, and depth information of the first object 830. Upon determining that the light of the first object 830 is not focused on the both eyes of the user, the device may adjust the locations of the first lens 822 and the second lens 824.

As another example, the device may determine whether light of a second object 840 being projected on the first lens 822 and the second lens 824 is focused on the both eyes of the user, based on the locations of the first lens 822 and the second lens 824, and depth information of the second object 840. Upon determining that the light of the second object 840 is not focused on the both eyes of the user, the device may selectively adjust the location of the second lens 824 among the first lens 822 and the second lens 824.

The lenses 822 and 824 according to an embodiment may be included inside the device or may be included in an apparatus independent from the device. For example, when the device is combined with a container to provide AR or VR to the user, the lenses 822 and 824 may be included in the container. An example of the container may include an HMD display as described with reference to FIG. 7.

Figure 9:
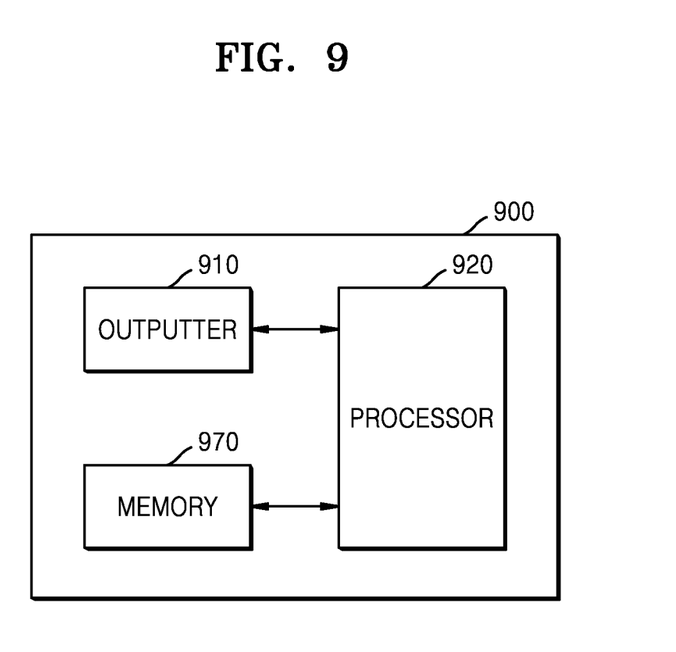
FIGS. 9 and 10 are block diagrams for describing a configuration of a device, according to an embodiment.
Figure 10:
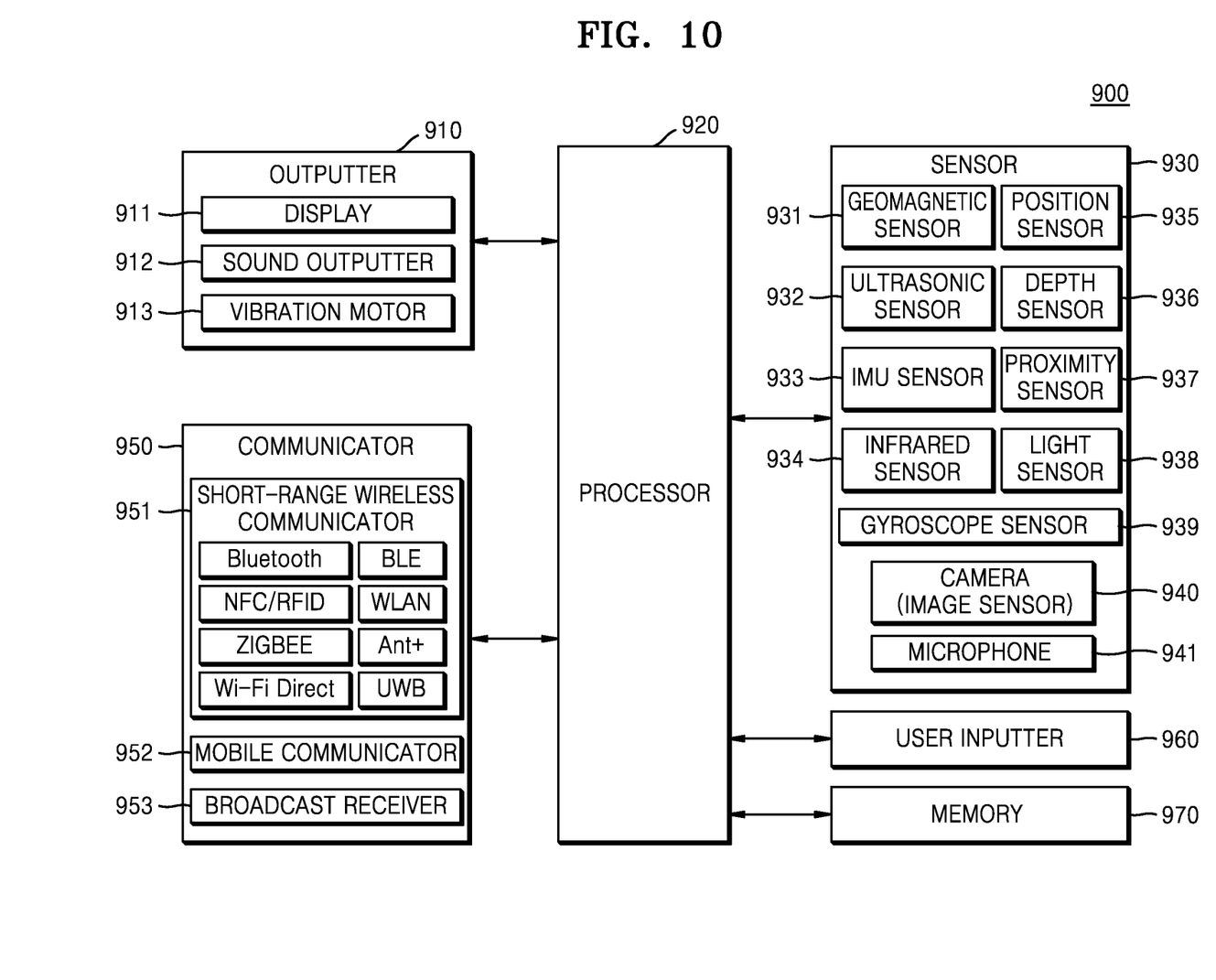

FIGS. 9 and 10 are block diagrams for describing a configuration of a device 900, according to an embodiment.

As shown in FIG. 9, the device 900 according to an embodiment may include an outputter 910, at least one processor 920, and a memory 970. However, not all of the components shown are essential components. The device 900 may be implemented by more or fewer components than those illustrated. For example, as shown in FIG. 10, the device 900 according to an embodiment may further include a sensor 930, a communicator 950, and a user inputter 960, in addition to the outputter 910, the at least one processor 920, and the memory 970.

Hereinafter, the above components will be described.

The outputter 910 may output an audio signal, a video signal, or a vibration signal, and may include a display 911, a sound outputter 912, and a vibration motor 913.

The display 911 displays information processed by the device 900. For example, the display 911 may output a virtual image or a real-world image. Also, the display 911 may include at least one light-emitting device to output information in a form of light. For example, when light of the virtual image is output on the display 911, the display 911 may include light-emitting devices in units of pixels.

According to an embodiment, the display 911 may be a transparent display. The transparent display is an information display device in which a rear surface of a screen displaying information is transparent. The transparent display includes a transparent element, and transparency may be adjusted by adjusting light transmittance for the transparent element or by adjusting an RGB value of each pixel.

When the display 911 is configured as a touch screen by forming a layer structure with a touch pad, the display 911 may be used as an input device as well as an output device.

The display 911 may include at least one of a liquid crystal display, a thin-film transistor-liquid crystal display, an organic light-emitting diode, a flexible display, a 3-dimensional (3D) display, and an electrophoretic display. The device 900 may include two or more displays 911 according to an implementation of the device 900.

The sound outputter 912 outputs audio data received from the communicator 950 or stored in the memory 970. Also, the sound outputter 912 outputs a sound signal related to a function performed by the device 900 (for example, identification of a true user's hand, application execution, call signal receiving sound, or message receiving sound). The sound outputter 912 may include a speaker, a buzzer, or the like.

The vibration motor 913 may output a vibration signal. For example, the vibration motor 913 may output a vibration signal corresponding to audio data or video data (for example, call signal receiving sound or message receiving sound). When a user input is generated, the vibration motor 913 may output a vibration signal corresponding thereto.

The processor 920 generally controls all operations of the device 900. For example, the processor 920 may execute programs stored in the memory 970 to generally control the outputter 910, the at least one sensor 930, the communicator 950, the user inputter 960, and the memory 970.

The processor 920 according to an embodiment may recognize an image. For example, the processor 920 may recognize at least one virtual image to implement VR, when operated in a VR mode. As another example, the processor 920 may recognize at least one real-world image to implement AR, when operated in a VR mode.

The processor 920 may identify a plurality of real-world objects or a plurality of virtual objects included in the recognized image. For example, when operated in the VR mode, the processor 920 may identify a plurality of virtual objects included in a recognized virtual image. As another example, when operated in the AR mode, the processor 920 may identify a plurality of real-world objects included in a recognized real-world image.

The processor 920 may obtain depth information of each of the plurality of identified real-world objects or virtual objects. Also, the processor 920 may control the display 911 to output the light of the virtual image corresponding to the plurality of identified real-world objects or virtual objects, based on the depth information of each of the plurality of identified real-world objects or virtual objects. For example, the processor 920 may determine a light output direction regarding each pixel configuring the virtual image based on the obtained depth information of each of the plurality of identified real-world objects or virtual objects. The processor 920 may control the display 911 to output the light according to the determined light output direction.

In detail, when a display mode is determined to be the VR mode, the processor 920 may determine a focal length of a pixel at a location corresponding to each of the plurality of virtual objects from the virtual image, based on the depth information of each of the plurality of virtual objects. The processor 920 may control the display 911 to output the light according to the determined focal length.

As another example, when the display mode is determined to be the AR mode, the processor 920 may determine the focal length based on the depth information of each of the plurality of real-world objects. The processor 920 may control the display 911 to output the light according to the determined focal length.

The processor 920 according to an embodiment may control a location of a lens projecting light output through the display 911. For example, the processor 920 may determine the location of the lens in which an accommodation distance and a vergence distance match each other for each of the plurality of real-world objects or virtual objects, based on the obtained depth information of each of the plurality of real-world objects or virtual objects. The processor 920 may move the lens according to the determined location.

The at least one sensor 930 may detect a state of the device 900 or a state around the device 900 and transmit detected information to the processor 920.

According to an embodiment, the at least one sensor 930 may include a geomagnetic sensor 931, an ultrasonic sensor 932, an IMU sensor 933, an infrared sensor 934, a position sensor 935, a depth sensor 936, a proximity sensor 937, a light sensor 938, a gyroscope sensor 939, a camera image sensor 930, and a microphone 941, but is not limited thereto. Because functions of each sensor can be intuitively inferred by one of ordinary skill in the art from the name, detailed descriptions thereof will be omitted.

The communicator 950 may include one or more components enabling communication between the device 900 and an external device 2000 (for example, a server device, a mobile terminal, or the like). For example, the communicator 950 may include a short-range wireless communicator 951, a mobile communicator 952, and a broadcast receiver 953.

The short-range wireless communicator 951 may include a Bluetooth communicator, a Bluetooth low energy (BLE) communicator, a near field communicator, a wireless local area network (WLAN) (Wi-Fi) communicator, a Zigbee communicator, an infrared data association (IrDA) communicator, a Wi-Fi direct (WFD) communicator, an ultra-wideband (UWB) communicator, or an Ant+ communicator, but is not limited thereto.

The mobile communicator 952 may transmit or receive a wireless signal to or from at least one of a base station, an external terminal, and a server, on a mobile communication network. Here, the wireless signal may include various types of data according to transmission and reception of an image signal, a voice call signal, an image call signal, or a text/multimedia message.

The broadcast receiver 953 may receive a broadcast signal and/or information related to a broadcast from an external source through a broadcast channel. The broadcast channel may include a satellite channel or a terrestrial channel According to an implementation example, the device 900 may not include the broadcast receiver 953.

The user inputter 960 is a unit into which data for a user to control the device 900 is input. For example, the user inputter 960 may include a key pad, a dome switch, a touch pad (contact capacitance type, pressure resistive type, an infrared detection type, surface ultrasonic wave conduction type, integral tension measuring type, piezo-effect type, or the like), a jog wheel, a jog switch, or the like, but is not limited thereto.

According to an embodiment, the user inputter 960 may detect a user input, such as a touch input or a hovering input. Also, according to an implementation example, the user inputter 960 may include a gesture detector for detecting the user's gesture. For example, the user inputter 960 may detect a user input for determining the display mode.

The memory 970 may store a program for processes and controls of the processor 920, input/output data (for example, a virtual image or a real-world image), and one or more instructions.

For example, the memory 970 may include at least one type of storage medium among a flash memory type, a hard disk type, a multimedia card micro type, a card type memory (for example, a secure digital (SD) or an extreme digital (XD) memory), a random-access memory (RAM), a static RAM (SRAM), a read-only memory (ROM), an electrically erasable programmable ROM (EEPROM), a programmable ROM (PROM), a magnetic memory, a magnetic disk, and an optical disk. The programs stored in the memory 970 may be classified into a plurality of modules depending on functions.

Meanwhile, specific embodiments have been described in the detailed description of the present disclosure, but various modifications may be possible without departing from the scope of the present disclosure. Therefore, the scope of the present disclosure should not be limited to the embodiments described above, but should be determined not only by the scope of the following claims, but also by the equivalents of the claims.

Block diagrams disclosed in the present disclosure may be construed to one of ordinary skill in the art that a circuit for implementing the principles of the present disclosure is conceptually represented. Similarly, it may be recognized by one of ordinary skill in the art that arbitrary flowcharts, flow diagrams, state transition diagrams, and pseudo-codes, and the like are substantially expressed in computer-readable media, and represent various processes executable by a computer or a processor regardless of whether the computer or the processor is explicitly shown. Accordingly, the above-described embodiments of the present disclosure may be written as a program executable on a computer, and may be implemented in a general-purpose digital computer operating the program using a computer-readable recording medium. Examples of the computer-readable medium include storage media such as magnetic storage media (for example, read-only memory (ROM), floppy disks, and hard disks), and optical readable media (for example, CD-ROM and DVD).

Functions of various elements shown in the drawings may be provided through the use of dedicated hardware as well as hardware that may execute software in relation to appropriate software. When provided by a processor, these functions may be provided by a single dedicated processor, a single shared processor, or a plurality of individual processors that may be partially shared. In addition, the term "processor" or "controller" should not be construed as exclusively referring to hardware that is capable of executing software, and may unlimitedly and implicitly include read-only memory (ROM), random-access memory (RAM), and non-volatile storage device for storing digital signal processor (DSP) hardware and software.

In claims of the present specification, an element represented as a unit for performing a particular function encompasses any method of performing the particular function, and such an element may include any type of software including a combination of circuit elements that perform the particular function or including firmware or microcode combined to a circuit suitable for executing software for performing the particular function.

In the present specification, the expression "an embodiment" of the principles of the present disclosure and various modifications of the expression indicate that specific features, structures, and characteristics are included in at least one embodiment of the principles of the present disclosure in relation to this embodiment. Thus, the expression "in an embodiment" and any other modifications throughout the present specification are not necessarily referring to the same embodiment.

In the present specification, the expression "at least one of" in "at least one of A and B" is used to encompass only a selection of a first option A, only a selection of a second option B, or a selection of both options A and B. As an additional example, "at least one of A, B, and C" may encompass only a selection of a first enumerated option A, only a selection of a second enumerated option B, only a selection of a third enumerated option C, only a selection of the first and second enumerated options A and B, only a selection of the second and third enumerated options B and C, and a selection of all three options A, B, and C. One of ordinary skill in the art may clearly expand the interpretation even when more items are enumerated.

Hereinabove, embodiments of the present disclosure have been described.

All embodiments and conditional examples disclosed in the present specification are described to help one of ordinary skill in the art to understand the principles and concept of the present disclosure, and one of ordinary skill in the art will understand that the present disclosure may be implemented in modified forms within the range that does not depart from the essential characteristics of the present disclosure. Therefore, the embodiments should be considered in descriptive sense only and not for purposes of limitation.

The scope of the present disclosure is set forth in the claims rather than the foregoing description, and all differences within the scope equivalent thereto should be construed as being included in the present disclosure.

The invention claimed is:

1. A method of processing an image, the method comprising:
   identifying a plurality of real-world objects or a plurality of virtual objects included in an image recognized by a device;
   obtaining depth information of the plurality of real-world objects or of the plurality of virtual objects;
   determining a direction for light output from a plurality of light emitting devices corresponding to the plurality of real-world objects or the plurality of virtual objects, based on the depth information, wherein the plurality of light emitting devices are included in a plurality of pixels of a display of the device; and
   outputting light of a virtual image corresponding to the plurality of identified real-world objects or the plurality of virtual objects, based on the determined direction for light,
   wherein a first direction for light output from the plurality of light emitting devices corresponding to a first object is determined based on a straight line connecting the first object of the plurality of real-world objects or the plurality of virtual objects and a center of a left eye and a right eye of a user,
   wherein a second direction for light output from the plurality of light emitting devices corresponding to a second object of the plurality of real-world objects or of the plurality of virtual objects is determined based on a straight line connecting the second object and the center of the left eye and the right eye of the user, and
   wherein the first direction for light and the second direction for light are different.

2. The method of claim 1, wherein the output light is transmitted to eyes of the user wearing the device via a lenticular lens provided in the device.

3. The method of claim 1, further comprising determining a display mode of the device,
   wherein the identifying comprises:
      identifying the plurality of virtual objects included in the recognized image in response to the display mode being in a virtual reality (VR) mode; and
      identifying the plurality of real-world objects included in the recognized image in response to the display mode being in an augmented reality (AR) mode.

4. The method of claim 3, further comprising:
   in response to the display mode being determined to be the VR mode, determining a focal length for a light emitting device of a pixel at a location corresponding to the plurality of virtual objects in the virtual image, based on the depth information,
   wherein the direction for light is determined based on the focal length.

5. The method of claim 3, wherein the outputting comprises:
   in response to the display mode being determined to be the AR mode, determining a focal length for a light emitting device of a pixel at a location corresponding to the plurality of identified real-world objects based on the depth information,
   wherein the direction for light is determined based on the focal length.

6. The method of claim 1, further comprising:
   determining a location of a lens projecting the light from the device, based on the depth information of the plurality of identified real-world objects or virtual objects; and
   moving the lens according to the determined location.

7. A device for processing an image, the device comprising:
   a display;
   a memory storing one or more instructions; and
   at least one processor configured to execute the one or more instructions stored in the memory to:
      identify a plurality of real-world objects or a plurality of virtual objects included in a recognized image,
      obtain depth information of the plurality of real-world objects or of the plurality of virtual objects,
      determine a direction for light output from a plurality of light emitting devices corresponding to the plurality of real-world objects or the plurality of virtual objects, based on the depth information, wherein the plurality of light emitting devices are included in a plurality of pixels of a display of the device, and
      control the display to output light of a virtual image corresponding to the plurality of identified real-world objects or the plurality of virtual objects, based on the determined direction for light,
   wherein a first direction for light output from the plurality of light emitting devices corresponding to a first object is determined based on a straight line connecting the first object of the plurality of real-world objects or the plurality of virtual objects and a center of a left eye and a right eye of a user,
   wherein a second direction for light output from the plurality of light emitting devices corresponding to a second object of the plurality of real-world objects or of the plurality of virtual objects is determined based on a straight line connecting the second object and the center of the left eye and the right eye of the user, and
   wherein the first direction for light and the second direction for light are different.

8. The device of claim 7, further comprising a lenticular lens,
   wherein the output light is transmitted to eyes of the user wearing the device via the lenticular lens.

9. The device of claim 7, wherein the at least one processor is further configured to execute the one or more instructions to:
   determine a display mode,
   identify the plurality of virtual objects included in the recognized image in response to the display mode being in a virtual reality (VR) mode, and
   identify the plurality of real-world objects included in the recognized image in response to the display mode being in an augmented reality (AR) mode.

10. The device of claim 9,
    wherein the at least one processor is further configured to execute the one or more instructions to:
       in response to the display mode being determined to be the VR mode, determine a focal length for a light emitting device of a pixel at a location corresponding to the plurality of virtual objects in the virtual image, based on the depth information, and
    wherein the direction for light is determined based on the focal length.

11. The device of claim 9,
    wherein the at least one processor is further configured to execute the one or more instructions to:
       in response to the display mode being determined to be the AR mode, determine a focal length for a light emitting device of a pixel at a location corresponding to the plurality of identified real-world objects based on the depth information, and
    wherein the direction for light is determined based on the focal length.

12. A computer program product comprising a non-transitory recording medium storing a program for executing:
    an operation of identifying a plurality of real-world objects or a plurality of virtual objects included in an image recognized by a device;
    an operation of obtaining depth information of the plurality of identified real-world objects or of the plurality of virtual objects;
    an operation of determining a direction for light output from a plurality of light emitting devices corresponding to the plurality of real-world objects or the plurality of virtual objects, based on the depth information, wherein the plurality of light emitting devices are included in a plurality of pixels of a display of the device; and
    an operation of outputting light of a virtual image corresponding to the plurality of identified real-world objects or the plurality of virtual objects, based on the determined direction for light,
    wherein a first direction for light output from the plurality of light emitting devices corresponding to a first object is determined based on a straight line connecting the first object of the plurality of real-world objects or the plurality of virtual objects and a center of a left eye and a right eye of a user,
    wherein a second direction for light output from the plurality of light emitting devices corresponding to a second object of the plurality of real-world objects or of the plurality of virtual objects is determined based on a straight line connecting the second object and the center of the left eye and the right eye of the user, and
    wherein the first direction for light and the second direction for light are different.

* * * * *